United States Patent
Kuroki et al.

(10) Patent No.: US 6,790,799 B2
(45) Date of Patent: Sep. 14, 2004

(54) GLASS PANEL FOR COLOR CATHODE RAY TUBE, AND CATHODE RAY TUBE

(75) Inventors: Yuichi Kuroki, Funabashi (JP); Tsunehiko Sugawara, Funabashi (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/139,326

(22) Filed: May 7, 2002

(65) Prior Publication Data

US 2003/0076027 A1 Apr. 24, 2003

(30) Foreign Application Priority Data

May 15, 2001 (JP) ......................... 2001-145371

(51) Int. Cl.[7] .................. C03C 3/068; C03C 3/085
(52) U.S. Cl. ...................... 501/64; 501/69; 501/72; 313/480
(58) Field of Search .............. 501/64, 69, 70, 501/72, 71, 65; 313/480, 477; 65/30.1

(56) References Cited

U.S. PATENT DOCUMENTS

| | | | |
|---|---|---|---|
| 2,991,591 A | | 7/1961 | Gabor et al. |
| 3,751,238 A | * | 8/1973 | Grego et al. ............... 65/30.14 |
| 4,390,637 A | * | 6/1983 | Daiku ........................ 501/64 |
| 4,566,893 A | | 1/1986 | Hopkins et al. |
| 5,252,112 A | * | 10/1993 | Shibaoka et al. .......... 65/30.13 |
| 5,445,285 A | | 8/1995 | Sugawara et al. |
| 5,536,995 A | | 7/1996 | Sugawara et al. |
| 5,925,977 A | | 7/1999 | Sugawara et al. |
| 5,964,364 A | | 10/1999 | Shimizu et al. |
| RE36,838 E | | 8/2000 | Sugawara et al. |
| 6,103,649 A | * | 8/2000 | Kim et al. ..................... 501/64 |
| 6,121,723 A | | 9/2000 | Sugawara et al. |
| 6,163,106 A | | 12/2000 | Sugawara et al. |
| 6,236,151 B1 | | 5/2001 | Murakami et al. |
| 6,251,811 B1 | | 6/2001 | Yanagisawa et al. |
| 6,607,999 B2 | * | 8/2003 | Hachitani ..................... 501/69 |
| 2001/0049327 A1 | | 12/2001 | Hachitani |

FOREIGN PATENT DOCUMENTS

| | | |
|---|---|---|
| EP | 0 367 269 | 5/1990 |
| EP | 1 142 840 | 10/2001 |
| JP | 7-206466 | 8/1995 |
| JP | 2000-348643 | 12/2000 |
| JP | 2001-294442 | 10/2001 |
| JP | 2002-60242 | 2/2002 |

* cited by examiner

*Primary Examiner*—Karl Group
*Assistant Examiner*—Elizabeth A. Bolden
(74) *Attorney, Agent, or Firm*—Oblon, Spivak, McClelland, Maier & Neustadt, P.C.

(57) ABSTRACT

A glass panel for a color cathode ray tube, which has a linear absorption coefficient of X-ray with a wavelength of 0.06 nm of from 30 to 38 $cm^{-1}$ and which has a layer having a compression stress of at least 70 MPa formed by a chemical strengthening method at least at short axis end portions and/or long axis end portions of the outer surface of a face portion and at a center portion of the inner surface of the face portion.

20 Claims, 1 Drawing Sheet

GLASS PANEL FOR COLOR CATHODE RAY TUBE, AND CATHODE RAY TUBE

The present invention relates to a color cathode ray tube to be used for e.g. a display for a television broadcast receiver (hereinafter referred to as a television) or a computer, and a glass panel to be used for such a cathode ray tube.

Firstly, the construction of a color cathode ray tube will be described referring to the attached drawings. FIG. 1 is a partially cross-sectional view of the entirety of the cathode ray tube.

The envelope of the cathode ray tube 1 is constituted by a glass bulb 2 which basically comprises a panel 3 for displaying picture images, a funnel-shaped funnel 4 sealingly bonded to the panel 3 and a neck 5 accommodating an electron gun 17. The panel 3 is constituted by an approximately rectangular face portion 7 constituting a picture image-displaying screen and a skirt portion 6 extending in a direction substantially perpendicular to the face portion 7 from its periphery via a blend R portion 11.

An explosion proof reinforcing band 8 is wound around the circumference of the skirt portion 6 to maintain the panel strength and to prevent scattering upon breakage. On the inner surface side of the face portion 7, a phosphor screen 12 which emits fluorescence by electron beam bombardment from an electron gun 17 and an aluminum film 13 to reflect the fluorescence emitted from the phosphor screen 12 towards the rear side of the cathode ray tube (towards the funnel 4 side), to the front side (to the face 7 side), are laminated, and a shadow mask 14 which regulates the position for electron beam bombardment, is further provided. The shadow mask 14 is fixed to the inner surface of the skirt portion 6 by stud pins 15. Further, A in FIG. 1 indicates a tube axis connecting the center axis of the neck 5 and the center axis of the panel 3.

Such a panel 3 is sealingly bonded to a seal edge portion of the funnel 4 by a sealing material such as a solder glass provided at the seal edge portion corresponding to the end portion of the skirt portion 6, whereby a sealing portion 10 is formed.

The glass bulb for a color cathode ray tube having the above construction, is used as a vacuum vessel, whereby atmospheric pressure is exerted to the outer surface, and consequently, a tensile stress attributable to an asymmetrical shape as is different from a spherical shell, is exerted over a relatively wide range (a stress formed by a difference between the inner and outer pressures when the glass bulb is evacuated, will hereinafter be referred to as a vacuum stress).

Further, in the process for producing a cathode ray tube, especially when evacuation is carried out while maintaining the bulb at a high temperature of about 350° C., a stress will be formed by the temperature difference resulting in such a step (the stress formed in such a heating step will be hereinafter referred to as a thermal stress) and will add to the above-mentioned vacuum stress, whereby in an extreme case, vigorous implosion may occur by instantaneous inflow of air and its counteraction, and thus damages may extend to the surrounding.

In the case of cathode ray tubes of other types such as projection type cathode ray tubes (projection tubes) or black and white (monochrome) cathode ray tubes, it is unnecessary to attach various parts such as a shadow mask to the inside of the panel, as mentioned above. Whereas, in the case of a color cathode ray tube, it is likely that the inner surface of the panel is damaged in a step of attaching such parts.

To guarantee prevention of such problems, an external pressure loading test is carried out by pressurizing a glass bulb uniformly scratched by 3150 emery paper, by air pressure or hydraulic pressure, taking into consideration the practical useful life of the cathode ray tube and the intensity of scratching on the glass surface which takes place in the step of assembling the glass bulb and the cathode ray tube, whereby the difference between the inner and outer pressures upon breakage, is determined, and the glass bulb is made to be durable against at least 0.3 MPa of such a pressure difference.

Further, in recent years, televisions are desired to have a large screen and a flat face portion and to have the weight reduced. If the wall thickness is simply made thin to accomplish such weight reduction, the above-mentioned vacuum stress will increase. Therefore, it is necessary to improve the strength of the panel, and some strengthening methods have been developed for this purpose.

Heretofore, as a means to reduce the weight of the glass bulb for a cathode ray tube, it has been practically proposed to form a compression stress layer on the surface of a glass panel in a thickness of ⅙ of the thickness of the glass by means of e.g. a physical strengthening method, as disclosed in Japanese Patent No. 2,904,067. However, it is impossible to uniformly quench a funnel or panel having a three dimensional structure and a non-uniform wall thickness distribution. Consequently, due to the non-uniform temperature distribution, a large tensile residual stress will be formed together with the compression stress, whereby the compression stress is rather limited to a level of 30 MPa at best, and it has been impossible to impart a large compression stress. Namely, when a physical strengthening method is employed, the weight reduction of the glass bulb is limited, since the compression stress which can be imparted, is relatively small.

On the other hand, it is known to reduce the weight by strengthening the surface of a glass bulb by a chemical strengthening method. This method is a method wherein certain alkali ions in glass are substituted by ions larger than the alkali ions at a temperature of not higher than the distortion point, and a compression stress layer is formed on the surface by the volume increase. For example, it can be accomplished by immersing a strontium/barium/alkali/alumina/silicate glass containing from about 5 to 8% of $Na_2O$ and from about 5 to 9% of $K_2O$, in a molten liquid of $KNO_3$ at about 450° C. In the case of such chemical strengthening method, a large compression stress up to the maximum of about 500 MPa can be obtained, and it is advantageous for the weight reduction over the physical strengthening in that no unnecessary tensile stress will be formed.

Further, a cathode ray tube generates X-rays when electron beams emitted from an electron gun are bombarded to the phosphor coated on the inner surface of the panel to let the phosphor emit light to project picture images, and such X-rays are likely to give damages to human bodies if they pass through the panel and leak out of the cathode ray tube. Accordingly, in addition to the above-mentioned weight reduction, the glass forming the panel is required to have an X-ray shielding ability.

As a component to let the glass absorb X-rays, it is known to employ an oxide having a high mass absorption coefficient for X-rays, such as SrO, BaO, ZnO or $ZrO_2$. For example, JP-A-7-206466 discloses an invention relating to a glass composition for a face of a cathode ray tube, which comprises from 58.5 to 60.5 wt % of $SiO_2$, from 1.0 to 2.5 wt % of $Al_2O_3$, from 6 to 7.5 wt % of $Na_2O$, from 8 to 9.5 wt % of $K_2O$, from 8 to 9.5 wt % of SrO, from 8 to 9.5 wt % of BaO, from 1 to 2.5 wt % of ZnO, from 2.5 to 3.5 wt % of $ZrO_2$, from 0 to 1 wt % of CaO+MgO, from 0.1 to 0.6 wt % of $CeO_2$, from 0.3 to 0.6 wt % of $TiO_2$ and from 0.2 to 0.5 wt % of $Sb_2O_3$.

However, such a glass composition is not suitable for a chemical strengthening method, and even if alkali ion substitution was carried out, it was not possible to form a compression stress layer having an adequate thickness required when the above-mentioned scratching by #150 emery paper is carried out.

Further, the X-ray shielding ability of the face portion of the panel exponentially changes with an increase or decrease of the product of the thickness of the face portion and the X-ray absorption coefficient of the glass forming the panel. Accordingly, when a panel employing a glass having a conventional composition, was made thin, there was a problem that the X-ray shielding ability substantially decreased.

The present invention has been made in view of the above problems, and it is an object of the present invention to solve the problem of an excessive load of the vacuum stress when the thickness is made thin, by imparting a high compression stress to the inner surface and the outer surface of the panel by a chemical strengthening method, to solve a problem of the thermal stress or the damage during the production of a cathode ray tube, such as in a step of evacuation or attaching a shadow mask and to provide a glass panel for a color cathode ray tube having an adequate X-ray shielding ability, and a cathode ray tube employing such a glass panel.

To accomplish the above object, the present invention provides a glass panel for a color cathode ray tube (hereinafter referred to as a panel) which has a layer having a compression stress of at least 70 MPa (hereinafter referred to as a compression stress layer) formed by a chemical strengthening method at least at short axis end portions and/or long axis end portions of the outer surface of a face portion and at a center portion of the inner surface of the face portion. Such a compression stress layer preferably has a thickness of at least 30 μm.

Further, the glass forming the above panel preferably consists essentially of, as represented by mass percentage of oxides based on the total mass:

| | |
|---|---|
| $SiO_2$ | 53.0 to 65.0%, |
| $Al_2O_3$ | 0.5 to 5.0%, |
| $Na_2O$ | 3.0 to 13.0%, |
| $K_2O$ | 1.0 to 9.0%, |
| SrO | 3.0 to 8.6%, |
| BaO | 5.0 to 12.0%, |
| ZnO | 0.4 to 9.0%, |
| ZrO | 0.5 to 5.0%, |
| $TiO_2$ | 0.1 to 0.6%, |
| $CeO_2$ | 0.1 to 0.9%, |
| $Li_2O$ | 0.0 to 3.0%, |
| CaO | 0.0 to 4.0%, |
| MgO | 0.0 to 4.0%, |
| $WO_3$ | 0.0 to 3.0%, | wherein the total content of ZnO and $ZrO_2$ is from 2.5 to 11.0%, and the total content $C_1$ of SrO, BaO and CaO, the content $C_2$ of ZnO and the total content $C_3$ of ZnO and alkaline earth metal oxides, satisfy relations of $0.6 \leq C_1/C_3 \leq 0.9$ and $0.05 \leq C_2/C_3 \leq 0.4$.

Further, the present invention provides a cathode ray tube employing the above glass panel for a color cathode ray tube.

Figure 1:
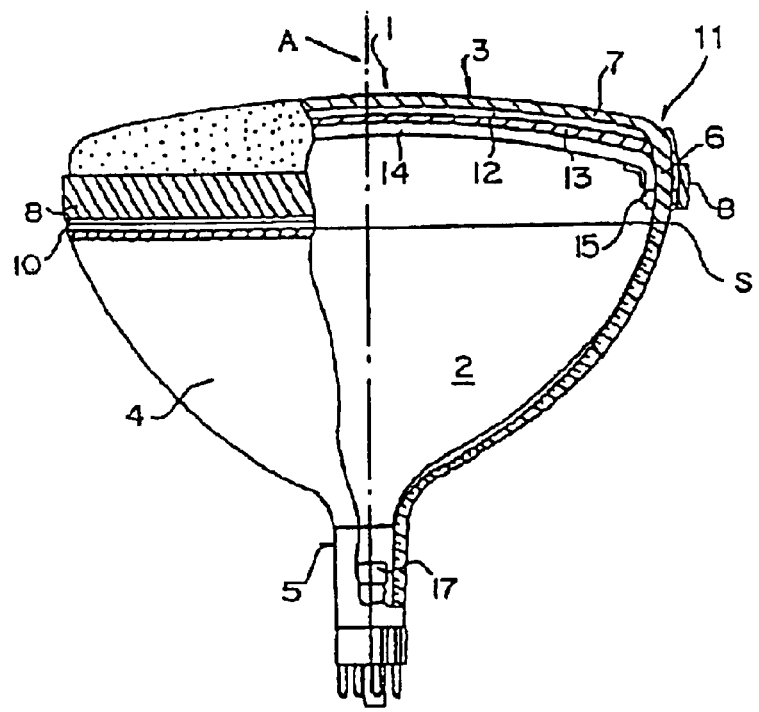
FIG. 1 is a schematic view showing the construction of a color cathode ray tube.

In the drawings, reference numeral 1 indicates a cathode ray tube, numeral 2 a glass bulb, numeral 3 a panel, numeral 4 a funnel, numeral 5 a neck, numeral 6 a skirt portion, numeral 7 a face portion, numeral 10 a sealing portion, numeral 27 a short axis end portion, and numeral 28 a long axis end portion.

Figure 2:
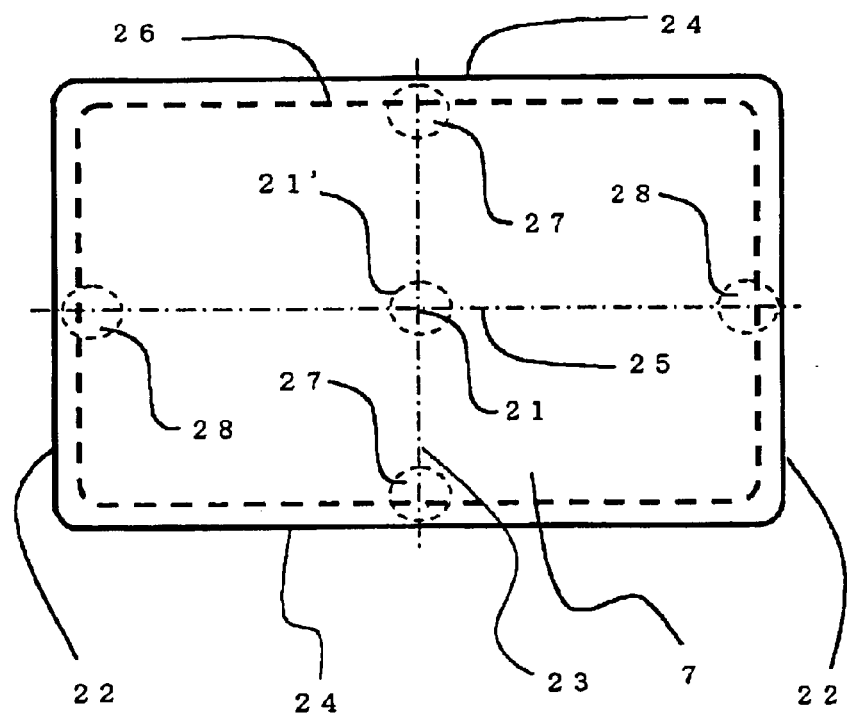
FIG. 2 is a schematic view showing the face portion of the color cathode ray tube.

Now, the present invention will be described in detail with reference to FIGS. 1 and 2.

The outer surface of the panel is the surface on the side of the panel facing a TV viewer, and the inner surface is the surface which is located on the rear side of the above outer surface, i.e. on the side to be coated with a phosphor, and which constitutes an inner side when the panel is assembled in a glass bulb.

And, among axes passing through the center 21 of the face portion 7, the axis parallel to short sides 22 of the face portion is a short axis 23 of the face portion, and the axis parallel to long sides 24 of the face portion is a long axis 25 of the face portion.

The panel of the present invention is characterized in that it has a compression stress layer at ends of the short axis 23 (hereinafter referred to as short axis end portions) and/or ends of the long axis 25 (hereinafter referred to as long axis end portions) on the outer surface of the face portion and at the center 21 and its vicinity (hereinafter referred to as the center portion 21') on the inner surface of the face portion. Here, the above ends are meant for positions where the short axis 23 or the long axis 25 intersects the effective screen edge (picture image edge) 26 and its vicinity. In FIG. 2, the short axis end portions 27 and the long axis end portions 28 are shown.

The above compression stress layer is required to have a compression stress of at least 70 MPa, since if the stress value is less than 70 MPa, the glass is susceptible to scratching. The compression stress is preferably at least 110 MPa, more preferably at least 130 MPa.

The linear absorption coefficient of X-ray is usually represented by $\mu$ (cm$^{-1}$) and is a value calculated by the following mathematical formula (a) wherein the contents (mass percentage) of the above respective components as oxides are represented by $f_{(1)}$ to $f_{(n)}$ (%) respectively, and the mass absorption coefficients of the respective components as oxides at a wavelength of 0.06 nm are represented by $W_{(1)}$ to $W_{(n)}$ (cm$^2$/g), respectively. In the present invention, the X-ray absorption coefficient means the linear absorption coefficient of X-ray with a wavelength of 0.06 nm, unless otherwise specified.

$$\mu = \rho \sum_{i=1}^{n} \left( \frac{f_{(i)}}{100} \times W_{(i)} \right) \tag{a}$$

And, the chemical strengthening method is a method wherein alkali ions in the surface layer of glass are substituted by monovalent cations having a larger ion radius in an external medium to have the network structure of glass constricted to form a compression stress, as mentioned above.

In silicate glass, alkali and alkaline earth elements are irregularly contained as network modifiers in the network structure constituted by Si—O bonds, but the alkali ions in the glass surface layer can be substituted by monovalent ions having larger ion radii in an outer medium, by utilizing a characteristic such that among network modifiers, monovalent cations can be moved in the interior of glass relatively freely. As a result, larger ions will get into the positions from which alkali ions detached, while pushing and constraining the surrounding network structure, thereby to form a compression stress.

Specifically, a method of immersing a glass containing $Na^+$ in a melt of $KNO_3$ to replace $Na^+$ with $K^+$, is adopted as a common chemical strengthening method. Such a chemical strengthening method is suitable for reducing the thickness, since it is capable of imparting a high compression stress as compared with a physical strengthening method. The present invention is not limited to a chemical strengthening method employing a melt of $KNO_3$.

By the above chemical strengthening method, it is possible to form a layer having a compression stress of at least 70 MPa on the inner surface and the outer surface of the panel, whereby the bending strength can be improved from about 4 to 6 times (220 to 330 MPa) as compared with non-strengthened state (from 50 to 65 MPa). Accordingly, an allowable stress for designing various portions of the glass bulb can be improved, and particularly, the allowable stress at the face portion can remarkably be improved, whereby the thickness reduction, and consequently, weight reduction, will be possible.

For example, in the case of a panel for a 36 model cathode ray tube, the thickness at the center of the face portion is usually about 20.0 mm. Whereas, in the case of a panel having a compression stress layer formed by a chemical strengthening method as described above, the thickness can be reduced to a level of about 11.2 mm.

However, with glass having a conventional composition, the X-ray absorption coefficient will be from about 28 to 29 $cm^{-1}$, and in the case of a 36 model panel employing such glass, X-ray can not adequately be shielded unless the thickness is about 12.0 mm under a usual condition, although such may depend also on the bombardment condition of the electron beam. Accordingly, in order to make the thickness reduction to the maximum level possible by forming the above compression stress layer, it is necessary to improve the X-ray absorption coefficient by at least 7% as compared with the glass having the conventional composition, to a level of at least 30 $cm^{-1}$.

However, to bring the X-ray absorption coefficient to a level higher than 38 $cm^{-1}$, it is necessary to increase the content of SrO, BaO or the like having a high mass absorption coefficient, whereby there will be a problem that such a component is likely to bring about devitrification during melting of the glass and is likely to hinder the substitution of alkali ions in the chemical strengthening method. Accordingly, the X-ray absorption coefficient (wavelength: 0.06 nm) is controlled to be from 30 to 38 $cm^{-1}$.

Further, by imparting a compression stress as described above, it is possible to improve the bending strength from about 4 to 6 times. However, it has been found that by making the thickness of the above compression stress layer to be at least 30 μm in the thickness direction of the panel, it is possible to improve the strength at least 5 times even after scratching by an emery polishing paper having a grain size of #150. A thickness of at least 40 μm is more preferred, since scratch marks will not thereby reach the tensile stress layer, and the scratch resistance is thus improved.

Further, the glass for forming the panel of the present invention preferably consists essentially of, as represented by mass percentage of oxides based on the total mass, from 53.0 to 65.0% of $SiO_2$, from 0.5 to 5.0% of $Al_2O_3$, from 3.0 to 13.0% of $Na_2O$, from 1.0 to 9.0% of $K_2O$, from 3.0 to 8.6% of SrO, from 5.0 to 12.0% of BaO, from 0.4 to 9.0% of ZnO, from 0.5 to 5.0% of ZrO, from 0.1 to 0.6% of $TiO_2$, from 0.1 to 0.9% of $CeO_2$, from 0.0 to 3.0% of $Li_2O$, from 0.0 to 4.0% of CaO, from 0.0 to 4.0% of MgO and from 0.0 to 3.0% of $WO_3$, wherein the total content of ZnO and $ZrO_2$ is from 2.5 to 11.0%, and the total content $C_1$ of SrO, BaO and CaO, the content $C_2$ of ZnO and the total content $C_3$ of ZnO and alkaline earth metal oxides, satisfy relations of $0.6 \leq C_1/C_3 \leq 0.9$ and $0.05 \leq C_2/C_3 \leq 0.4$.

The above contents are determined to accomplish improvement of the strength by the chemical strengthening method as compared with a conventional product, while satisfying various characteristics required for a cathode ray tube and to obtain a panel free from a decrease of the X-ray absorbing ability. Also in the following, "%" represents mass percentage unless otherwise specified.

If the content of $SiO_2$ is less than 53.0%, there will be problem that the chemical durability tends to be poor, or there will be a problem that elution of lead is likely to increase. On the other hand, if it exceeds 65.0%, there will be a problem that it tends to be difficult to bring the X-ray absorption coefficient to a level of at least 30 $cm^{-1}$, while satisfying various properties required for the panel. Accordingly, it is preferably from 53.0 to 65.0%. Such a content is more preferably from 56.0 to 60.0%.

If the content of $Al_2O_3$ is less than 0.5%, there will be a problem that the weather resistance tends to be poor, and if it exceeds 5.0%, there will be a problem that the softening point tends to be too high, and the viscosity increase tends to be remarkable as the temperature rises, whereby forming tends to be difficult. Accordingly, it is preferably from 0.5 to 5.0%. Such a content is more preferably from 1.5 to 3.0%.

If the content of $Na_2O$ is less than 3.0%, there will a problem that the softening point tends to be too high, and the viscosity increase will be remarkable as the temperature rises, whereby forming tends to be difficult, or there will be a problem that it tends to hinder the substitution of $Na^+$ in the glass by $K^+$ in the melt containing $KNO_3$, and if it exceeds 13.0%, the electrical resistance tends to decrease. Accordingly, it is preferably from 3.0 to 13.0%. Such a content is more preferably from 6.0 to 8.0%.

$K_2O$ is incorporated in an amount of at least 1.0% for the purpose of controlling the thermal expansion coefficient and an increase of electrical resistance due to a mixed alkali effect with $Na_2O$. However, if it is incorporated beyond 9.0%, there will be a problem that it hinders the substitution of $Na^+$ in the glass composition by $K^+$ in the melt containing $KNO_3$. Accordingly, it is preferably from 1.0 to 9.0%. Such a content is more preferably from 4.0 to 8.0%.

SrO is a component to improve the X-ray absorbing ability of the panel. If its content is less than 3.0%, it is difficult to accomplish an X-ray absorption coefficient of at least 30 $cm^{-1}$, and if it exceeds 8.6%, there will be a problem that it hinders the substitution of $Na^+$ in the glass by $K^+$ in the melt containing $KNO_3$, and the devitrification temperature tends to be too high, whereby a devitrified substance tends to precipitate and flow into the product. Accordingly, it is preferably from 3.0 to 8.6%.

Like SrO, BaO is a component to improve the X-ray absorption coefficient of the panel. If its content is less than 5.0%, it tends to be difficult to accomplish an X-ray absorption coefficient of at least 30 $cm^{-1}$, and if it exceeds 12.0%, there will be a problem that it tends to hinder the substitution of $Na^+$ in the glass by $K^+$ in the melt containing $KNO_3$, and the devitrification temperature tends to be too high, whereby a devitrified substance is likely to flow into the product. Accordingly, it is preferably from 5.0 to 12.0%.

Like SrO and BaO, ZnO is a component to improve the X-ray absorption coefficient of the panel. If its content is less than 0.4%, it tends to be difficult to accomplish an X-ray absorption coefficient of at least 30 cm$^{-1}$, and if it exceeds 9.0%, the devitrification temperature tends to be too high, whereby a devitrified substance is likely to flow into the product. Accordingly, it is preferably from 0.4 to 9.0%.

Like SrO, BaO and ZnO, $ZrO_2$ is a component to improve the X-ray absorption coefficient of the panel. If its content is less than 0.5%, it tends to be difficult to accomplish an X-ray absorption coefficient of at least 30 cm$^{-1}$, and if it exceeds 5.0%, the melting property tends to be low. Accordingly, it is preferably from 0.5 to 5.0%.

If the content of $TiO_2$ is less than 0.1%, the effect for suppressing electron beam browning by ultraviolet ray and X-ray tends to be inadequate, and if it exceeds 0.6%, absorption of a visible short wavelength side tends to be too high. Accordingly, it is preferably from 0.1 to 0.6%.

$CeO_2$ is a component having an effect similar to the above $TiO_2$. If its content is less than 0.1%, the effect for suppressing electron beam browning by ultraviolet ray and X-ray tends to be inadequate, and if it exceeds 0.9%, absorption of visible short wavelength side tends to be too high. Accordingly, it is preferably from 0.1 to 0.9%.

Further, with respect to ZnO and $ZrO_2$, the total content by mass percentage is adjusted to be from 2.5 to 11.0%. ZnO and $ZrO_2$ have high mass absorption coefficients, and they are components to accelerate chemical strengthening. Accordingly, the total content is preferably at least 2.5%, but preferably does not exceed 11.0% in order to avoid the devitrification problem as mentioned above.

Further, as non-essential components, $Li_2O$, CaO, MgO, $Sb_2O_3$, $SO_3$ and/or $WO_3$ may be employed.

$Li_2O$ is a component to adjust the viscosity of glass. However, if it exceeds 3.0%, the electrical resistance tends to decrease. Accordingly, its content is at most 3.0%, preferably at most 2.0%.

CaO is a component to adjust the viscosity of glass and also has an effect of accelerating the substitution of $Na^+$ in the glass by $K^+$ in the melt containing $KNO_3$. However, if its content exceeds 4.0%, the softening point tends to be too high, and the viscosity increase tends to be remarkable as the temperature rises, whereby forming tends to be difficult. Accordingly, its content is preferably at most 4.0%.

Like CaO, MgO is a component to adjust the viscosity of glass and also has an effect of accelerating the substitution of $Na^+$ in the glass by $K^+$ in the melt containing $KNO_3$. However, if its content exceeds 4.0%, the softening point tends to be too high, and the viscosity increase tends to be remarkable as the temperature rises, whereby forming tends to be difficult. Accordingly, its content is preferably at most 4.0%.

$Sb_2O_3$ has a refining effect to reduce bubbles in molten glass. However, even if it is used beyond 1.0%, the refining effect is saturated and will not be improved any further. Accordingly, its content is preferably at most 1.0%.

Like $Sb_2O_3$, $SO_3$ has a refining effect to reduce bubbles in molten glass and can be used as a substitute component for $Sb_2O_3$. However, even if it is used beyond 1.0%, the refining effect is saturated and will not be improved any further, and there will be a problem that a stone is likely to be formed. Accordingly, its content is preferably at most 1.0%. As a refining component, in addition to the above $Sb_2O_3$ or $SO_3$, $As_2O_3$ is known to have a similar effect. However, its use is not desired from the viewpoint of a problem in the environmental protection.

Like SrO or BaO, $WO_3$ is a component to improve the X-ray absorption coefficient of the panel. However, if it exceeds 3.0%, the melting property of the glass deteriorates. Accordingly, its content is preferably at most 3.0%.

Further, as a component to adjust the color of the glass, a colorant such as CoO or NiO may suitably be employed.

$Fe_2O_3$ may be contained as a colorant or as an impurity. However, if it is used beyond 1%, an undesirable colored state will be brought about. Accordingly, its content is preferably at most 1%.

And, in such a case, the contents are adjusted, so that the total content $C_1$ of SrO, BaO and CaO, the content $C_2$ of ZnO and the total content $C_3$ of ZnO and alkaline earth metal oxides, satisfy relations of $0.6 \leq C_1/C_3 \leq 0.9$ and $0.05 \leq C_2/C_3 \leq 0.4$.

Here, among the above components, SrO, BaO, CaO and MgO correspond to the above alkaline earth metal oxides. Accordingly, the above $C_3$ will be the SrO content (%)+the BaO content (%)+the CaO content (%)+the MgO content (%)+the ZnO content (%). Likewise, $C_1$ is the SrO content (%)+BaO content (%)+the CaO content (%).

SrO, BaO and CaO are components which have high mass absorption coefficients as compared with other components. The above-mentioned $C_1/C_3$ is less than 0.6, the X-ray absorption coefficient of glass tends to be low. Therefore, it is preferably adjusted to be at least 0.6, but if it exceeds 0.9, the ion substitution in chemical strengthening tends to be impaired. Accordingly, preferred is $0.6 \leq C_1/C_3 \leq 0.9$ as mentioned above.

Further, ZnO is a component which accelerates the ion substitution in the chemical strengthening treatment. Accordingly, $C_2/C_3$ is preferably at least 0.05, but it exceeds 0.4, devitrification is likely to occur. Accordingly, preferred is $0.05 \leq C_2/C_3 \leq 0.4$.

And, the cathode ray tube of the present invention is characterized by employing the above-described panel. By employing the panel of the present invention which has a linear absorption coefficient of X-ray of from 30 to 38 cm$^{-1}$ and having a compression stress of at least 70 MPa imparted so that it has high strength, a cathode ray tube which is light in weight and excellent in safety, can be provided.

Now, the present invention will be described with reference to Examples. However, it should be understood that the present invention is by no means restricted by such specific Examples.

EXAMPLES 1 to 5

Reagent starting materials were mixed to obtain compositions (mass percentage: unit %) of Examples 1 to 5 shown in the following Table 1, in an amount of 500 g in each Example. Here, Examples 1 and 2 are Working Examples of the present invention, and Examples 3 to 5 are Comparative Examples. Then, the blended starting materials were heated and melted at 1,500° C. in a platinum crucible and further homogenized by stirring it at 1,500° C. for 1 hour, followed by refining for one hour. After the refining, the molten glass was cast into a plate having a width of 5 cm and a length of 25 cm, followed by gradual cooling. In this manner, five types of glass sheets were obtained. Further, mass absorption coefficients $\mu_m$ (cm$^2$/g) of the respective components are shown in Table 2.

TABLE 1

|  | Ex. 1 | Ex. 2 | Ex. 3 | Ex. 4 | Ex. 5 |
| --- | --- | --- | --- | --- | --- |
| $SiO_2$ | 56.7 | 57.6 | 61.6 | 61.6 | 55.8 |
| $Al_2O_3$ | 2.0 | 1.9 | 2.0 | 2.0 | 2.0 |

TABLE 1-continued

|  | Ex. 1 | Ex. 2 | Ex. 3 | Ex. 4 | Ex. 5 |
|---|---|---|---|---|---|
| Na₂O | 7.7 | 7.0 | 7.4 | 7.4 | 7.7 |
| K₂O | 7.7 | 7.5 | 7.6 | 7.6 | 5.2 |
| SrO | 6.8 | 7.8 | 8.7 | 8.7 | 12.0 |
| BaO | 7.5 | 8.0 | 9.6 | 9.6 | 13.0 |
| ZnO | 3.5 | 2.0 | 0.5 | 0.5 | 0.5 |
| CaO | 2.0 | 3.0 | 0.0 | 0.0 | 0.0 |
| ZrO₂ | 3.0 | 2.8 | 1.5 | 1.5 | 3.0 |
| MgO | 2.0 | 1.0 | 0.0 | 0.0 | 0.0 |
| Sb₂O₃ | 0.35 | 0.35 | 0.35 | 0.35 | 0.3 |
| TiO₂ | 0.45 | 0.45 | 0.45 | 0.45 | 0.3 |
| CeO₂ | 0.3 | 0.3 | 0.3 | 0.3 | 0.2 |
| LiO₂ | — | 0.3 | — | — | — |

TABLE 2

| Components | $\mu_m$ (cm²/g) |
|---|---|
| SiO₂ | 2.34 |
| Al₂O₃ | 2.11 |
| Na₂O | 1.69 |
| K₂O | 8.45 |
| SrO | 53.4 |
| BaO | 25.1 |
| ZnO | 28.5 |
| CaO | 8.81 |
| ZrO₂ | 53.5 |
| MgO | 1.92 |
| Sb₂O₃ | 18.2 |
| TiO₂ | 9.12 |
| CeO₂ | 25.3 |

Further, the following values calculated with respect to each Example based on the contents in Table 1, are shown in Table 3.
(*1): $C_3$ (%)=SrO content (%)+BaO content (%)+CaO content (%)+MgO content (%)+ZnO content (%),
(*2): Total of contents of ZnO and ZrO₂ (%)=ZnO content (%)+ZrO₂ content (%),
(*3): $C_1/C_3$={SrO content (%)+BaO content (%)+CaO content (%)}/$C_3$ (%),
(*4): $C_1/C_3$=ZnO content (%)/$C_3$ (%).

TABLE 3

|  | Ex. 1 | Ex. 2 | Ex. 3 | Ex. 4 | Ex. 5 |
|---|---|---|---|---|---|
| *1 | 21.8 | 21.8 | 18.8 | 18.8 | 25.5 |
| *2 | 6.5 | 4.8 | 2.0 | 2.0 | 3.5 |
| *3 | 0.75 | 0.86 | 0.97 | 0.97 | 0.98 |
| *4 | 0.16 | 0.09 | 0.03 | 0.03 | 0.02 |

Then, with respect to each glass plate after annealing, the density was measured by an Archimedes method, and the X-ray absorption coefficient at a wavelength of 0.06 nm was calculated by the formula (a).

Further, from each glass plate, a first sample piece having a width of 2 cm and a length of 5 cm was cut out. With respect to only four samples of Examples 1, 2, 4 and 5, chemical strengthening was carried out by a low temperature ion substitution strengthening method. Specifically, the first sample piece was put into a stainless steel container containing molten KNO₃ and heated in an electric furnace to carry out treatment by an ion substitution reinforcing method to form a compression stress layer on the surface of each first sample piece.

Then, with respect to each Example, the sample piece was gradually cooled, then washed and dried. Each of such five first sample pieces thus obtained, was sliced, and the thickness ($\mu$m) of the compression stress layer in the thickness direction of glass and the compression stress value (MPa) were measured by means of a polarizing microscope equipped with a Berek compensator, from the cross sectional direction.

Further, from each of the five glass plates, a second sample piece having a width of 1.5 cm, a thickness of 0.5 cm and a length of 6 cm, was cut out, and in the same method as in the case of the first sample pieces, the second sample pieces of Examples 1, 2, 4 and 5 were treated for chemical strengthening, and the bending strength (MPa) of each of the second sample pieces of Examples 1 to 5, was measured by a four point bending strength test. The four point bending strength test is a method wherein a load is exerted to a sample, and the strength is calculated from the load at breakage. Specifically, it is a method wherein the above second sample piece is scratched by a polishing paper of a grain size #150 with a force of about 0.1 MPa, and then it is set by a jig having a lower span of 55 mm and an upper span of 10 mm, and the four point bending strength measurement is carried out.

Further, 36 model panels having an aspect ratio of 16:9 were prepared by using glasses having the compositions of the above Examples 1 to 5, and with respect to the panels of Examples 1, 2, 4 and 5 among them, chemical strengthening treatment was applied under the same conditions as in the case of the above sample pieces. Here, the face portion of each panel was made to have the thinnest thickness allowable under a load of vacuum stress.

Then, the respective panels were welded to funnels and necks having known compositions to prepare bulbs of Examples 1 to 5. With respect to these bulbs, hydraulic pressure resistance strengths (MPa) were measured. As a method for measuring the hydraulic pressure resistance strength, a test method is employed wherein the respective glass bulbs for cathode ray tubes are introduced in a large hydraulic pressure resistance vessel, and pressure is exerted from outside, while maintaining the interior of the glass bulbs for cathode ray tubes under atmospheric pressure, whereby the pressures under which the bulbs were broken, were taken as the hydraulic pressure resistance strengths.

Now, in Table 4, the density (g/cm³) of glass of the first sample piece, the X-ray absorption coefficient (cm⁻¹), the heating temperature (° C.) and the heating time (hr) for the treatment by an ion substitution strengthening method by an electric furnace, the compression stress value (MPa) of the glass surface, the thickness ($\mu$m) of the compression stress layer, the bending strength (MPa) after scratching of the second sample piece, the thickness (mm) at the center of the face portion of the panel, the panel mass (kg) and hydraulic pressure resistance strength (MPa) of the bulb, are shown with respect to Examples 1 to 5.

TABLE 4

|  | Ex. 1 | Ex. 2 | Ex. 3 | Ex. 4 | Ex. 5 |
|---|---|---|---|---|---|
| Glass density (g/m³) | 2.83 | 2.85 | 2.78 | 2.78 | 2.97 |
| X-ray absorption coefficient (cm⁻¹) | 30.2 | 30.9 | 29.0 | 29.0 | 39.9 |
| Holding temperature (° C.) | 465 | 470 | — | 470 | 470 |
| Holding time (hr) | 12 | 16 | — | 8 | 16 |
| Compression stress (MPa) | 140 | 135 | — | 105 | 65 |
| Thickness of compression stress layer ($\mu$m) | 43 | 40 | — | 25 | 20 |
| Bending strength after scratching (MPa) | 220 | 200 | 26 | 90 | 60 |
| Thickness at the center of the face portion (mm) | 11.0 | 10.5 | 20.0 | 11.0 | 10.5 |

TABLE 4-continued

|  | Ex. 1 | Ex. 2 | Ex. 3 | Ex. 4 | Ex. 5 |
|---|---|---|---|---|---|
| Mass of panel (kg) | 24.8 | 24.3 | 34.6 | 24.8 | 24.3 |
| Hydraulic pressure resistance strength (MPa) | 3.1 | 3.0 | 3.5 | 2.1 | 1.9 |

As a result of the foregoing, in Example 5, SrO and BaO are larger than the contents in the present invention, and $C_1/C_3 > 0.9$, whereby no adequate ion substitution was carried out, and consequently, it was not possible to impart a compression stress of at least 70 MPa, even though chemical strengthening treatment was carried out under the same holding temperature and holding time as in Example 2. Whereas, in Example 2, a layer having a compression stress value of 135 MPa was formed.

Further, Examples 1 and 4 where the thickness of the face portion was equal (in both cases, the thickness of the face portion was 11 mm), were compared, whereby Example 4 wherein the X-ray absorption coefficient was less than 30.0 cm$^{-1}$, was one which has a possibility that the exposure rate exceeds 0.5 mR/hr, i.e. a level where leakage of X-ray is likely to adversely affect a human body. On the other hand, in Example 1, the exposure rate is lower than 0.5 mR/hr, thus indicating safety.

Further, with respect to the panel of Example 3 having no chemical strengthening treatment applied, it was required to make the face portion thick in order to be durable against vacuum stress, and consequently, it became very heavy. As compared with such Example 3, with other panels having chemical strengthening applied, it was possible to reduce the weight by about 30%.

As described in the foregoing, the panel of the present invention is suitable for chemical strengthening and at the same time, has a composition having a high X-ray shielding ability, whereby it can be made thin without impairing the safety, and consequently, it has an effect such that the weight can be reduced. Further, it provides an effect such that by using such a panel, it is possible to present a cathode ray tube excellent in safety and light in weight.

The entire disclosure of Japanese Patent Application No. 2001-145371 filed on May 15, 2001 including specification, claims, drawings and summary are incorporated herein by reference in its entirety.

What is claimed is:

1. A glass panel for a color cathode ray tube comprising at least SiO$_2$, Al$_2$O$_3$, Na$_2$O, K$_2$O, SrO, BaO, ZnO, ZrO$_2$, TiO$_2$, and CeO$_2$, having a linear absorption coefficient of X-ray with a wavelength of 0.06 nm of from 30 to 38 cm$^{-1}$,
   wherein a layer having a compression stress of at least 70 MPa is present,
   wherein the total content of ZnO and ZrO$_2$ is from 2.5 to 11.0%, and the total content $C_1$ of SrO, BaO and CaO, the content $C_2$ of ZnO and the total content $C_3$ of ZnO and all alkaline earth metal oxides, satisfy relations of
   $0.6 \leq C_1/C_3 \leq 0.9$, and
   $0.05 \leq C_2/C_3 \leq 0.4$,
   wherein the panel is formed by a chemical strengthening method and has a compression stress of at least 70 MPa at least at one or both of short axis end portions or long axis end portions of the outer surface of a face portion and at a center portion of the inner surface of the face portion of the panel.

2. The glass panel according to claim 1, wherein the thickness of the layer having said compression stress of 70 MPa is at least 30 µm.

3. The glass panel according to claim 1, which consists essentially of, as represented by mass percentage of oxides based on the total mass:

| | |
|---|---|
| SiO$_2$ | 53.0 to 65.0%, |
| Al$_2$O$_3$ | 0.5 to 5.0%, |
| Na$_2$O | 3.0 to 13.0%, |
| K$_2$O | 1.0 to 9.0%, |
| SrO | 3.0 to 8.6%, |
| BaO | 5.0 to 12.0%, |
| ZnO | 0.4 to 9.0%, |
| ZrO$_2$ | 0.5 to 5.0%, |
| TiO$_2$ | 0.1 to 0.6%, |
| CeO$_2$ | 0.1 to 0.9%, |
| Li$_2$O | 0.0 to 3.0%, |
| CaO | 0.0 to 4.0%, |
| MgO | 0.0 to 4.0%, and |
| WO$_3$ | 0.0 to 3.0%, |

4. A color cathode ray tube comprising the glass panel claimed in claim 1.

5. The glass panel of claim 3, wherein the mass percentage of Al$_2$O$_3$ is from 1.5 to 3.0.

6. The glass panel of claim 3, wherein the mass percentage of SiO$_2$ is from 56.0 to 60.0.

7. The glass panel of claim 3, wherein the mass percentage of Na$_2$O is from 6.0 to 8.0.

8. The glass panel of claim 3, wherein the mass percentage of K$_2$O is from 4.0 to 8.0.

9. The glass panel of claim 3, wherein the mass percentage of Li$_2$O is at most 2.0.

10. The glass panel of claim 3, which further consists essentially of Sb$_2$O$_3$.

11. The glass panel of claim 3, wherein the mass percentage of SiO$_2$ is from 56.7 to 57.6.

12. The glass panel of claim 3, wherein the total mass percentage of SrO and BaO is from 8.0 to 15.8.

13. The glass panel of claim 3, wherein the total mass percentage of SrO and BaO is from 14.3 to 15.8.

14. The glass panel of claim 3, wherein the mass percentage of ZnO is from 2.0 to 3.5.

15. The glass panel of claim 1, wherein the compression stress of the layer is at least 110 MPa.

16. The glass panel of claim 1, wherein the compression stress of the layer is at least 130 MPa.

17. The glass panel of claim 1, comprising the following components in mass percentage:

| | |
|---|---|
| Al$_2$O$_3$ | 1.5 to 3.0, |
| SiO$_2$ | 56.0 to 60.0, |
| Na$_2$O | 6.0 to 8.0, |
| K$_2$O | 4.0 to 8.0, and |
| Li$_2$O | 0.0 to 2.0. |

18. The glass panel of claim 1, wherein $0.75 \leq C_1/C_3 \leq 0.86$.

19. The glass panel of claim 1, wherein $0.09 \leq C_2/C_3 \leq 0.16$.

20. The glass panel of claim 1, wherein the mass percentage of BaO is from 5.0 to 8.0.

* * * * *